H. W. LEONARD.
ELECTRICALLY PROPELLED VEHICLE.
APPLICATION FILED MAR. 2, 1903. RENEWED MAY 26, 1908.
1,121,379.
Patented Dec. 15, 1914.
4 SHEETS—SHEET 1.
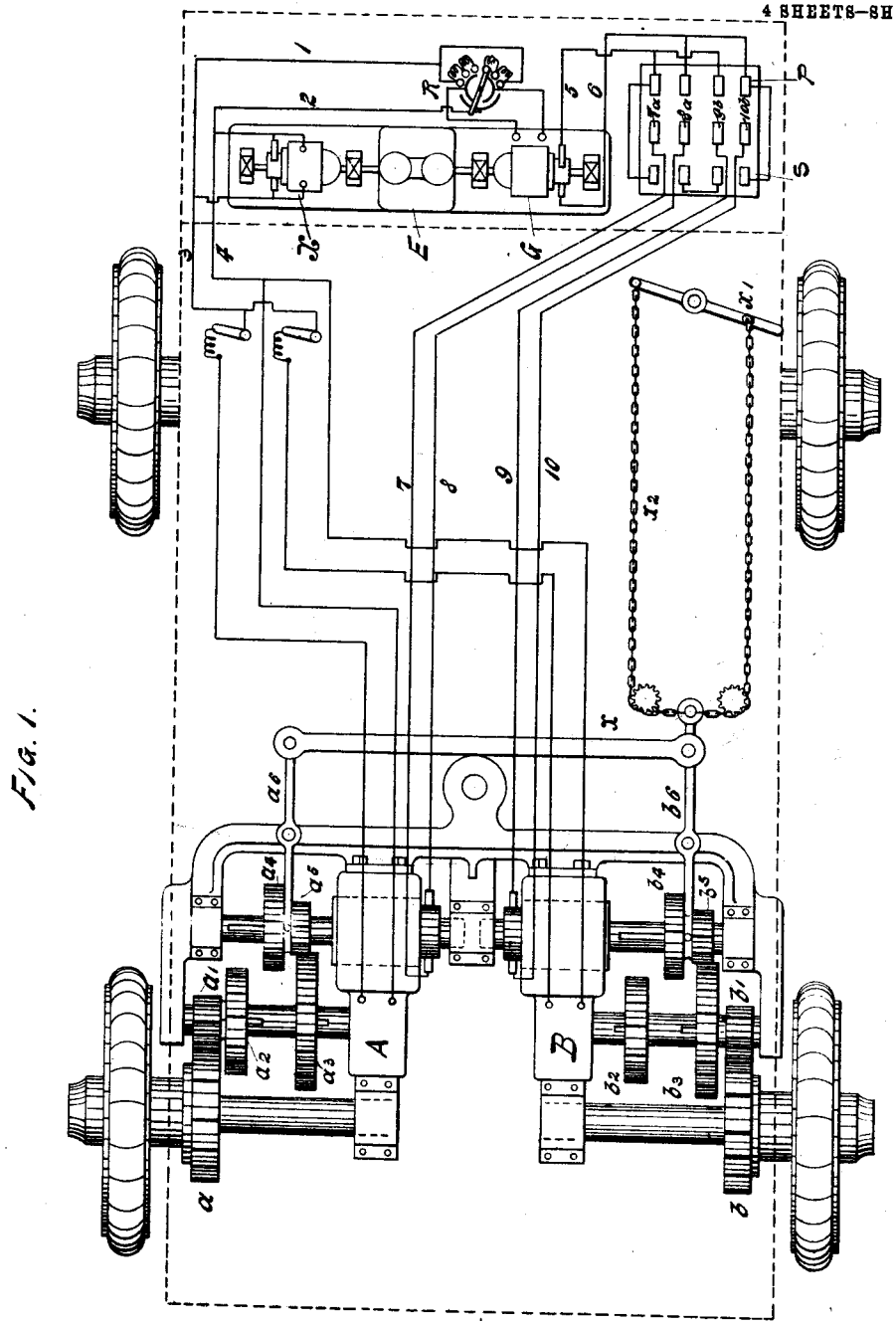
WITNESSES:
Harvey C Ellis
Hugo Boepple Jr.
INVENTOR
H. Ward Leonard
BY
ATTORNEY

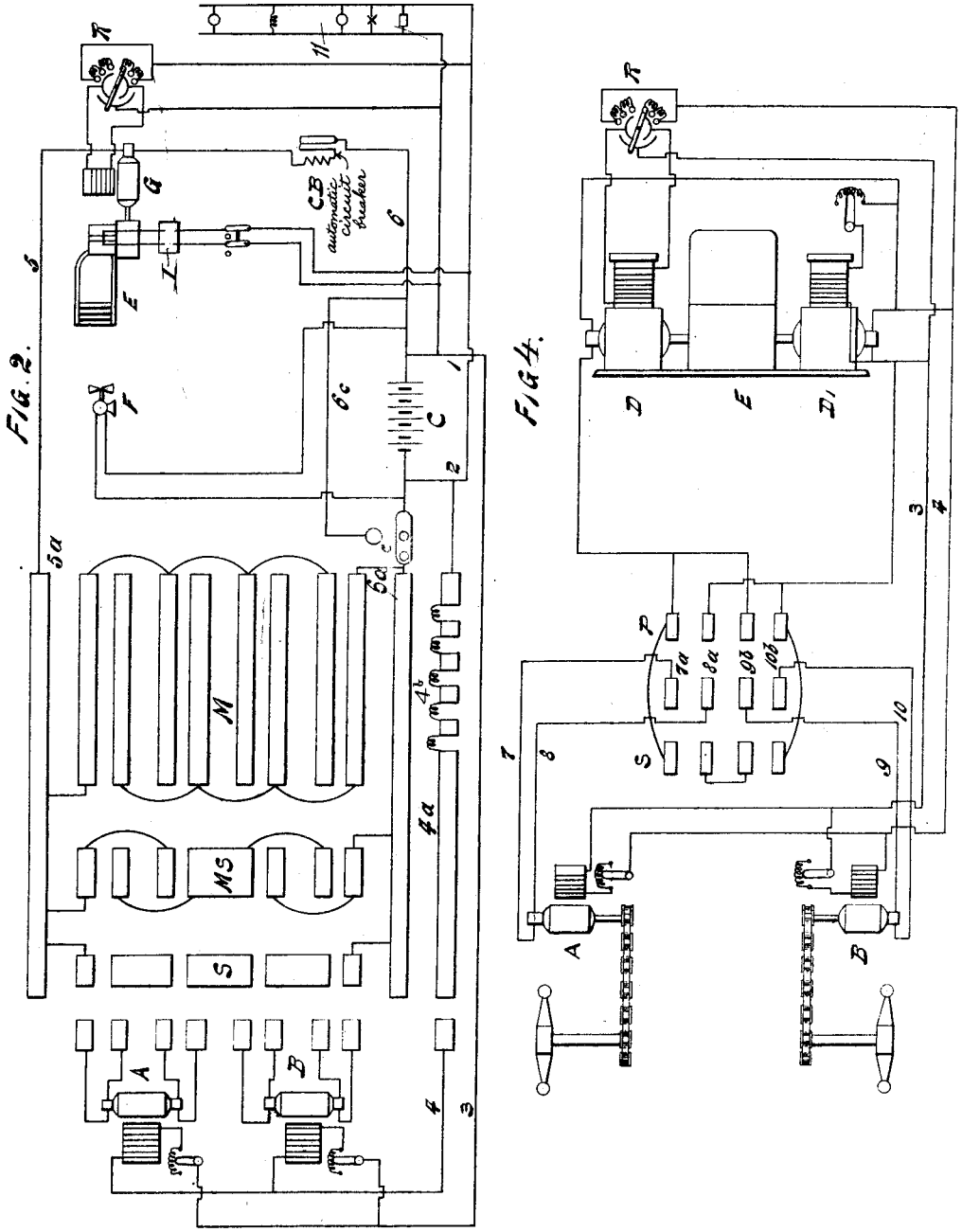

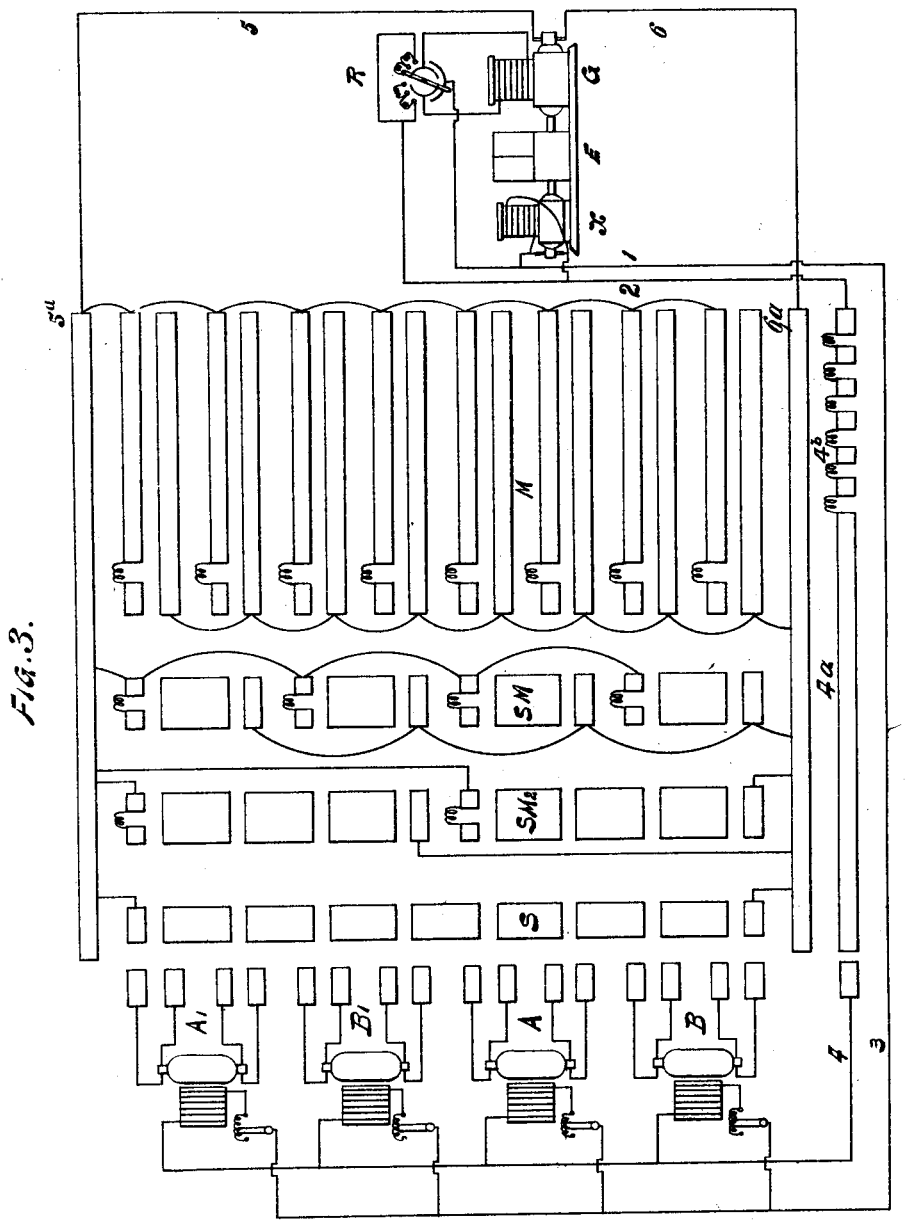

H. W. LEONARD.
ELECTRICALLY PROPELLED VEHICLE.
APPLICATION FILED MAR. 2, 1903. RENEWED MAY 26, 1908.
1,121,379.
Patented Dec. 15, 1914.
4 SHEETS—SHEET 4.
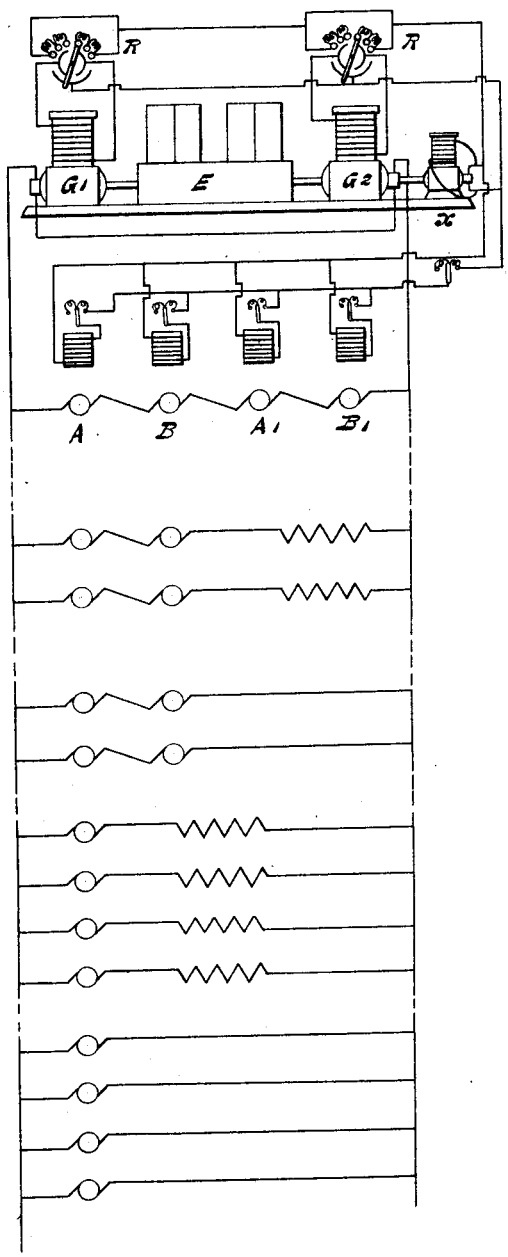

UNITED STATES PATENT OFFICE.

HARRY WARD LEONARD, OF BRONXVILLE, NEW YORK.

ELECTRICALLY-PROPELLED VEHICLE.

1,121,379.  Specification of Letters Patent.  Patented Dec. 15, 1914.

Application filed March 2, 1903, Serial No. 145,686. Renewed May 26, 1908. Serial No. 435,119.

*To all whom it may concern:*

Be it known that I, HARRY WARD LEONARD, a citizen of the United States, residing at Bronxville, in the county of Westchester and State of New York, have invented a certain new and useful Improvement in Electrically-Propelled Vehicles, of which the following is a specification.

My invention relates to various devices and more especially to that class of vehicles in which an engine is employed for driving a dynamo electric machine which supplies energy to one or more propelling electric motors.

The principal object of my invention when applied to vehicles is to secure more perfect control of the speed and effort over the wide range desirable in order to secure the best results in practice.

Further objects of my invention are the reduction of wear, breakage, noise, strain and shock present in apparatus of this general character as heretofore proposed; the utilization of the simplest, cheapest and best form of prime mover under conditions most favorable for its use; and the use of electric motors for propelling the vehicle under conditions most favorable to their efficiency and durability.

The principal features of my invention when applied to wheeled vehicles may be briefly stated as follows: I develop upon the vehicle itself by means of a prime mover, such as a gasolene engine, power employed in the propulsion of the vehicle forming the moving load element in the particular embodiment of my invention hereinafter described, and this power is transformed into electric energy, the electromotive force of which is controllable over a wide range at the will of the operator. This electric energy is supplied to one or more propelling motors at such a voltage and current as will cause the vehicle to travel at the speed desired according to the road surfaces and grades met with. In practice the electrical transmission as I employ it replaces the usual mechanical variable or change speed gear, although in some instances I may employ such a gear in addition to the electrical control or electrical transmission gear as it may be termed.

These and other features of my invention will be understood from the following description and accompanying drawings which illustrate certain forms of my invention.

Figure 1 is a diagrammatic illustration of a motor truck embodying certain features of my invention; Fig. 2 is a diagram illustrating an embodiment of certain features of my invention and a form of a series-parallel controller which may be employed for controlling the electrical apparatus illustrated in Fig. 1; Fig. 3 is a diagrammatic view of another embodiment of certain features of my invention; Fig. 4 is a diagrammatic view of another embodiment of certain features of my invention in which a counter-electromotive force system of regulation is employed for the dynamo electric machines supplying energy to the propelling motors, and a series-parallel method of control for the armatures of the propelling motors; and Fig. 5 is a diagram of a modified system of motor control, the extensions indicating the connections established by means of a series-parallel controller.

In Fig. 1 the rear traction wheels are journaled on separate short shafts, and each wheel is driven by separate electric motors A and B through double reduction gears. The motors are spring suspended at one end in any suitable and well-known manner, and the vehicle axle passes through the other end of each motor as is common in modern street railway motor suspension.

The double reduction gear comprises gear wheel $a$ which is keyed to the shaft of its respective traction wheel, a pinion $a'$ meshing therewith, a gear wheel $a^2$, a gear wheel $a^3$ of larger diameter than wheel $a^2$, said pinion and the gear wheels $a^2$ and $a^3$ being keyed on a counter shaft, and pinions $a^4$ and $a^5$ splined on the armature shaft of motor A, the latter pinion being of smaller diameter than the pinion $a^4$, and said two pinions being arranged to slide on the shaft so as to place one or the other in mesh with its respective gear wheel $a^2$ or $a^3$. The reduction gear for motor B is exactly the same, and corresponding wheels and pinions are marked $b$ to $b^5$. As illustrated in Fig. 1, pinions $a^5$ and $b^5$ are in mesh with gear wheels $a^3$ and $b^3$ respectively, which is the lowest speed connection, and when the pinions on the motor shafts are shifted simultaneously pinions $a^4$ and $b^4$ are brought into mesh with gear wheels $a^2$ and $b^2$ respectively, which connection gives the second or higher speed. The pinions on the motor shaft may be shifted simultaneously in any suitable manner, and for the purpose of illustration I have shown two pivoted levers $a^6$ and $b^6$ which engage collars on the pinions, and said levers being connected by a rod $x$ so as to shift in unison. These levers are connected to a shifting or controlling lever $x'$ within reach of the operator by means of a rod or chain $x^2$. At the forward end of the truck is located preferably a two cylinder gasolene engine E which drives a generator G. This generator supplies the energy for the armatures of the propelling motors, and the engine also drives an exciter X of constant electromotive force which energizes the fields of the propelling motors and the generator.

The circuit connections of Fig. 1 are as follows: From the armature of exciter X extends a circuit 1—2 with which is connected a circuit 3—4 between which the field windings of motor A and B are connected in multiple through resistances. The field circuit of generator G is connected across the exciter circuit 1—2 through a reversing switch R. From the armature of generator G extends a circuit 5—6 to the stationary contacts of a series-parallel switch S—P and from the armatures A and B extend circuits 7—8 and 9—10, respectively, to four switch blades $7^a$, $8^a$, $9^b$, and $10^b$, respectively. The stationary contacts P are for connecting the motor armatures in parallel, and contacts S for connecting the armatures in series. In changing the armature connections from series to parallel, I may employ an intermediate step in which the armatures are in parallel but with a resistance in series with each. For this purpose I prefer to use a series-parallel controller of the drum type, but as this form of controller is well known I do not illustrate the same in detail, but it may be arranged somewhat similar to that illustrated in Fig. 3. Usually, however, I can dispense with the use of armature resistances in changing from the series to the parallel connection, or vice versa, as the operator can readily and quickly change the voltage of the generator by means of rheostat R while the armature circuit is open, so as to adapt the voltage of the generator to the counter volts of the motor armatures in the new arrangement about to be made, and then close the circuit to the motor armatures in their new relation.

With the apparatus illustrated in Fig. 1 it will be seen that two speeds can be obtained in either direction by manipulating the series-parallel switch S—P and by manipulating the gearing between the motor shafts and the traction wheels two additional speeds may be obtained, as will be apparent. If the controller S—P is provided with intermediate steps, two additional speeds will be obtainable for each step, i. e., one due to the position of the controller and the other by shifting the gears at the motors. To reverse the direction of rotation of armatures A and B the field of generator G is reversed by means of reversing rheostat R.

By exciting the motor fields independently of the current or voltage of the motor armatures, and by passing the same current through the two motor armatures in series with each other, I secure a combined torque from the two armatures which is more definitely divided between the two armatures than has been heretofore attained by reason of the field strength of the motors being maintained independently of the speed or relative speeds of the motors and of the current passing through the motor armatures or other variable conditions of operation which may occur, and by reason of the fact that the current passing through each of the motor armatures is the same as that passing through the other motor armature. This results in a more perfect control under conditions of starting and at very slow speeds and while being brought to rest by the dynamic braking action by the motors acting as generators.

In Fig. 2 I show a modified method of control for the propelling motors A, B, shown in Fig. 1. This modified arrangement involves the employment of two windings in each armature and a commutator for each winding so that the windings can be connected in series or in parallel. In this arrangement I also prefer to use in practice intermediate steps in which resistances are inserted first before passing from a lower to a higher electromotive force per winding as is well understood by those skilled in the art of electric motor control. In this arrangement I have also shown a storage battery C which is so connected in the armature circuit of generator G that the normal current to the motor armatures charges the battery. The voltage of the battery is, of course, materially lower than that of the generator or motors. This battery serves as the source of constant electromotive force for exciting the motor and generator fields. This battery also supplies the current for operating an electric fan motor F which blows air over the radiating surface of the thermosiphon water cooling system for the cylinders of gasolene engine E.

In the controller as illustrated in Fig. 2 the circuit 5—6 from the generator G is connected by brushes or other suitable contact devices with contact plates $5^a$ and $6^a$ between which are connected three or more sets of contact plates M, M S and S representing, respectively, multiple, multiple series and series, whereby when the stationary contacts with which the armature circuits of motors A and B are connected make contact with said contacts M, M S and S successively, said armature winding will be connected respectively in multiple, multiple series and series, that is, when on contacts M the windings on both armatures will all be in multiple arc relation; when on contacts M S the two armatures will be in series relation but with the windings of each armature connected in multiple arc relation; and when on contacts S all the windings will be in series relation. The field windings of motors A and B are connected in multiple across circuit 3—4 with a resistance in series with each winding. The conductor 3 is connected with a conductor 1 extending from one terminal of battery C, and conductor 4 is connected to a stationary contact which makes contact with plates 4ᵃ and 4ᵇ, which are connected to conductor 2 extending from the other terminal of battery C. The field circuit of generator G is connected across conductors 1—2 with a reversing rheostat R in the circuit for reversing the field excitation of the generator. As shown battery C is connected between contact plate 6ᵃ and conductor 6 so as to be in the armature circuit of generator G, but I provide a switch c whereby the battery may be cut out of the armature circuit of generator G when fully charged without breaking the field exciting circuit of the motors and generator. For this purpose a loop 6ᶜ extends around the battery from conductor 6, and it will be seen, that when switch c is moved to the second contact, circuit 6 extends around the battery to plate 6ᵃ, but the battery still supplies energy to the field windings. In conductor 6 between battery C and generator G an automatic circuit breaker C B is preferably connected.

With the arrangement illustrated in Fig. 2, I obtain three fixed speeds for each voltage of the supply current and three torques in the ratio of one, two and four, with a certain current from generator G and a certain motor field. By means of generator G, I can obtain any range of electromotive force from zero to maximum, and when the windings of the motor armatures are all in multiple I can weaken the fields of the motors by resistances 4ᵇ connected between the set of contacts 4ᵃ to obtain a still further range of speed. The rheostats in series with the field windings of motors A and B are independent of each other so that the fields may be adjusted as desired relatively to each other.

The storage battery C may also be employed for supplying the current for the electric igniting device of the engine and leads from the battery are shown extending to the induction coil I and thence to the engine for that purpose. Current from the battery may also be used for supplying electric lights, electric brakes, electric alarms, electric heaters, etc., and this is indicated on the drawing by a circuit 11 from the battery having various translating devices connected in parallel thereto.

The storage battery also serves as a source of energy for starting by closing the armature circuit of the generator, as by closing the circuit through the motors, battery and circuit breaker after first exciting the field of the generator. The direction of the current through the circuit will be counter to the direction under normal running conditions and will therefore cause the generator to rotate in the proper direction and act as a motor to drive the engine. As soon as the engine begins to produce power, the electromotive force of the generator will rise until it exceeds that of the battery, since the generator has a much higher electromotive force than the battery, and the current will then flow in the normal direction for forward running. If the current rises to an excessive amount, the circuit breaker will open the circuit automatically. The operator would then reduce the generator field to zero, close the circuit breaker and proceed to operate the motor car by slowly building up the generator field. The starting up may also be accomplished by first giving the generator field its full strength and closing the armature circuit, while leaving the circuit of the sparking device open. This will cause the generator to operate as a motor at a low speed. The armature circuit should now be opened at the circuit breaker and the circuit of the sparking device closed simultaneously. This will cause the engine to operate and run up to full speed. The field strength of the generator should now be reduced and the armature circuit closed again which places the apparatus in condition for operation.

In Fig. 3 I have illustrated four propelling motors A, B, A' and B provided with double wound armatures as in Fig. 2. The field windings of these motors are connected in multiple arc relation across circuit 3—4 with a resistance in series with each winding for the purpose of adjusting the fields relatively to each other. Circuit 3—4 is connected across circuit 1—2 extending from exciter X, conductor 4 being attached to a stationary contact adapted to make contact with plates 4ᵃ and 4ᵇ which are connected with conductor 2. The field winding of generator G is connected across circuit 1—2 through reversing rheostat R. E represents a two-cylinder gasolene engine for driving machines X and G. The armature circuit 5—6 from generator G is connected with brushes or other suitable contacts engaging plates 5ᵃ and 6ᵃ and between these plates are connected a series of moving contacts M, S M, S M² and S, with which the stationary contacts to which the armature windings of the motors are connected, make contact. With the four sets of contacts arranged as shown the eight armature windings will be connected in multiple arc relation when the stationary contacts are on plates M; when on plates S M the two windings of each armature will be in series and the four armatures in multiple arc relation; when on plates S M² the windings will be in two series of four each, that is the windings of the two forward armatures will be in series and the windings of the two rear armatures will be in series, the two series being connected across the line in multiple arc relation; and when the stationary contacts are on plates S the eight armature windings will be in series across the line. In this diagram I have shown the intermediate steps supplied with resistances so as to pass smoothly from one arrangement of the armature windings to the next. The arrangement of windings and connections illustrated gives four torques in the ratios of one, two, four and eight, with a certain number of amperes generated by machine G, and constant motor fields. When the windings of the motor armatures are all in multiple the motor fields may be weakened by resistances 4ᵇ to obtain a still further range of speed. The electromotive force of the generator can be varied from zero to its maximum electromotive force in either sense to vary the energy supplied to the armatures of the propelling motors, and the field of the propelling motors can also be varied, so as to secure the widest possible range in speed and torque.

In Fig. 4 wherein I illustrate the counter electromotive force method of control, A and B represent the propelling motors geared to the rear traction wheels, E represents a two-cylinder gasolene engine and D, D' represent two dynamo electric machines driven by said engine. The field windings of the working motors are connected in multiple arc relation across the circuits 3—4, which circuit is connected across the armature terminals of machine D' and are of constant strength. Machine D' has a shunt field winding and machine D has its field winding connected across the armature terminals of machine D' through a regulating reversing rheostat R. The armatures of machines D and D' are connected in series to the stationary contacts of a series-parallel controller S P, and the armature circuits 7—8, 9—10 of the propelling motors are connected to switch blades 7ᵃ, 8ᵃ, 9ᵇ and 10ᵇ, respectively. It is well understood that the energy supplied to the armatures of the working motors through the agency of machine D and D' can be varied at will from zero to the combined electromotive force of both machines by adjusting the field of machine D so that it will either oppose or assist the electromotive force of machine D'. This arrangement in itself would give a very wide range of speed for the propelling motors, but by the addition of the series-parallel controller as in the arrangement of Fig. 1, the number of successive variations in speed or torque can be still further increased.

In Fig. 5 I have illustrated a system in which E represents a four cylinder gasolene engine and G' and G² dynamo electric machines driven by said engine, and X an exciter also driven by said engine. The field windings of the two machines G', G² are connected in parallel across the armature terminals of exciter X, a reversing rheostat R being connected in each field circuit. A, B, A' and B' represent the propelling motors, the field windings of which are connected in parallel across the armature terminals of exciter X. The armatures of these machines will be controlled by a series-parallel controller, similar to that illustrated in Fig. 3, and to illustrate the several connections, the circuit from generators G' G² is extended in sections. In this arrangement the armatures of machines G' and G² are connected in series and the successive connections of the motor armatures are illustrated in five combinations, viz., four armatures in series; two armatures in series in each group with a resistance in series with each group; two armatures in series in two groups without resistance; four armatures in parallel with a resistance in series in each; and four armatures in parallel without resistance. The energy supplied to the armatures of the propelling motors can be varied from zero to maximum in either direction by adjusting the reversing rheostats R relatively to each other. A rheostat is inserted in the field circuit of each motor for adjusting the fields relatively to each other, and another rheostat is connected in the circuit leading to those fields from exciter X for the purpose of regulating all the motor fields simultaneously and similarly.

It will be seen that if the electromotive force of the generator, or generators supplying energy to the circuit, is lower than that of the opposing electromotive forces in the circuit, as may be the case in going down grades or in retarding the machine, the armature of the generator will be driven as a motor and act to retard or limit the speed of the vehicle to any desired amount. I may therefore cause the vehicle to be retarded by lowering the electromotive force of the generator by weakening its field as by means of the rheostat; the motors will then acts as generators and supply energy to the generator which now acts as a motor. Since the vehicle when going down grade can be reversed and caused to back up the grade, it will be apparent that by placing the controlling rheostat at a proper position, a current can be passed from the generator through the motors which will tend to move the vehicle backward up the grade but will be just sufficient to balance the tendency of the vehicle to move down the grade by virtue of its weight. My invention therefore affords a simple arrangement for holding the vehicle stationary when either going up a grade or going down a grade and without the necessity of using brakes.

While I have shown separate dynamo electric generators and dynamo electric motors as the means for transmitting electrically the energy of the prime mover to the wheels, it will be understood that my invention is not limited to such means but may cover any suitable means for electrically transmitting the power of the prime mover to the driven device or devices.

While I have disclosed my invention as applied to a wheeled vehicle, the claims herein are not limited thereto and where I have used the terms moving load element, or common load element and the like in the claims, it will be understood that the driven element may be at any driven load element such as a boat, movable platform, hoist, pump, machine tool, etc.

While I have shown and described certain forms of my invention, it will be understood that the scope of my invention is not confined thereto, and that I am limited only as indicated in the following claims.

What I claim is:

1. The combination of a dynamo having an armature and field winding, a mechanically separate electric motor supplied from said armature, an electromotive force producing device in series in the circuit passing through the dynamo armature and electric motor, a separate circuit from said device for exciting a field winding of said motor, and means for varying the electromotive force of said generator for varying the speed of the motor.

2. The combination of a dynamo having an armature and a field winding, a mechanically separate electric motor supplied from said armature, a counter electromotive force producing device in the armature circuit of said motor and dynamo, and separate circuits from said device for exciting the field windings of said generator and said motor.

3. The combination of a dynamo having an armature and a field winding, a mechanically separate electric motor supplied from said armature, an electromotive force producing device in the armature circuit of said motor and dynamo, separate circuits from said device for exciting the field windings of said dynamo and said motor, and a controller in the field circuit of said dynamo for reversing the field thereof.

4. The combination of an internal combustion engine, an electric generator whose armature is driven by said engine under normal operating conditions, a motor armature supplied with energy from said generator armature, a field winding for the generator adapted to be separately excited, a storage battery supplying current to said winding, a field winding for said motor armature separately excited from said battery, and means whereby said battery may be charged by energy derived from said engine and employed at the will of the operator to start said engine in operation.

5. The combination of an internal combustion engine, electric ignition means therefor, a dynamo having an armature and a field winding, a motor supplied with current from said dynamo, a storage battery connected in series with said motor and the armature of said dynamo, means independent of the speed of said engine for varying the electromotive force of said dynamo to vary the speed of the motor, and means for supplying current from said battery to a winding of said electric ignition means.

6. The combination of an internal combustion engine, electric ignition means therefor, a dynamo driven by said engine having an armature and a field winding, a translating device supplied with current from said dynamo, a counter electromotive force producing device in series with said translating device and the armature of said dynamo, a field winding for said dynamo connected across said counter electromotive force producing device, and said ignition means having a winding supplied with energy derived from said dynamo.

7. The combination of an internal combustion engine, electric ignition means therefor, an electric generator driven by said engine, a mechanically separate translating device supplied with current from said generator, a storage battery in series with said translating device and the armature of said generator, a switch for closing a circuit around the battery to connect the translating device directly with said generator, and said ignition means having a winding supplied with energy derived from said generator.

8. The combination of an internal combustion engine, electric ignition means therefor, an electric generator driven by said engine, a mechanically separate translating device supplied with current from said generator, a storage battery in series with said translating device and the armature of said generator, a switch for opening the connection between the translating device and said battery and for making direct connection with the armature circuit of said generator, and said ignition means having a winding supplied with energy derived from said generator.

9. The combination of an internal combustion engine, an electric generator driven thereby, a mechanically separate translating device supplied with current from said generator, a storage battery in series with said translating device and the armature of said generator, a switch for opening the connection between the translating device and said battery and for making direct connection with the armature circuit of said generator, and a field winding for said generator connected across said battery and receiving current therefrom.

10. The combination of an internal combustion engine, an electric generator driven thereby, a mechanically separate translating device supplied with current from said generator, a storage battery in series with said translating device and the armature of said generator, and an automatic circuit breaker between said battery and said armature.

11. The combination of an internal combustion engine having electric ignition means, an electric generator whose armature is driven by said engine under normal operating conditions, a motor armature supplied with energy from said generator armature, a field winding for the generator adapted to be separately excited, a storage battery supplying current to the ignition means of said engine, and means whereby said battery may be charged by energy derived from said engine and employed at the will of the operator to start said engine in operation.

12. The combination of an internal combustion engine, a dynamo driven thereby, said dynamo having a field winding adapted to be separately excited, a storage battery supplying current to said winding, electric ignition means for said engine supplied with energy from said battery, and functionally related means whereby said battery may be charged from energy derived from said engine and employed at the will of the operator to operatively start the engine.

13. The combination of an internal combustion engine, a dynamo driven by said engine, said dynamo having a field winding adapted to be separately excited, a storage battery supplying current to said winding and charged by energy derived from said engine, electric ignition means for said engine, and means functionally related to said engine dynamo, storage battery and ignition means for causing a part of the energy derived from the engine to be used for starting the engine.

14. The combination of an internal combustion engine, an electric generator whose armature is driven by said engine under normal operating conditions, a motor armature in series with said generator armature, a storage battery in series with said generator and motor armatures, an automatic circuit breaker between said battery and the generator armature, a switch for opening the circuit between the motor armature and the battery and for closing a direct circuit between said armature and the generator armature, a circuit from said battery for supplying current to a field winding of said generator, electrically operated means functionally related to said engine, and another circuit from said battery for supplying current to said means.

15. The combination of an electric generator, an electric motor whose armature is mechanically separate from the armature of said generator, said motor armature being supplied with current from said generator armature, a storage battery whose maximum electromotive force is materially lower than that of said generator and said motor, and circuits from said battery for exciting field windings of said generator and said motor.

16. The combination of an internal combustion engine, an electric generator, means for mechanically driving the armature of said generator by said engine under normal operating conditions, a motor armature mechanically separate from said generator and in series with said generator armature, means comprising a storage battery adapted to excite a field winding of said generator independently of current passed through said armatures, and a switch for closing the circuit of said battery through said generator armature.

17. The combination of an internal combustion engine, an electric generator whose armature is mechanically driven by said engine under normal operating conditions, a motor armature in series with said generator armature, a storage battery charged by energy derived from said engine, a circuit from said battery for supplying current to a field winding of said generator, means for electrically igniting the explosive gas in the engine cylinder, said means being supplied with current from said battery, and means for varying and reversing the electromotive force produced by said generator.

18. The combination of an internal combustion engine, an electric generator whose armature is driven by said engine under normal operating conditions, a motor armature in series with said generator armature, a storage battery in series with said generator and motor armatures, a circuit from said battery supplying current to a field winding of said generator, a second circuit from said battery for controlling the ignition spark of said engine, and means for varying and reversing the electromotive force produced by said generator.

19. The combination of an internal combustion engine, an electric generator whose armature is mechanically driven by said engine under normal operating conditions, a motor mechanically separate from said generator and having its armature in series with said generator armature, a storage battery electrically connected therewith, and means for varying the electromotive force of said generator whereby the generator is caused to act as a motor and the motor to act as a generator.

20. The combination of an internal combustion engine, an electric generator whose armature is mechanically driven by said engine under normal operating conditions, a motor mechanically separate from said generator and having its armature in series with said generator armature, a storage battery in series with said generator and motor armatures, a circuit from said battery for supplying current to a field winding of the generator, and means for varying the electromotive force of said generator whereby the generator is caused to act as a motor and the motor to act as a generator.

21. The combination of a generator, a storage battery in series with the armature of said generator, a plurality of electric motors, and means for connecting the armatures of said motors in parallel with each other and in series with the said generator armature and said battery in a common circuit.

22. The combination of an electric generator, a plurality of electric motors, a storage battery in the armature circuit of said generator and motors, the maximum electromotive force of said battery being materially less than that of said generator and said motors, said motors having field windings excited independently of the armature current, and means for connecting said motors in series or in parallel with each other.

23. The method of controlling a plurality of electric motors, which consists in passing current through the motor armatures in series with each other, opening the armature circuit while connected in series, reducing the voltage of the source to correspond to that desired for each motor, and then passing current through the motor armatures in parallel.

24. The method of controlling a plurality of electric motors which consists in passing current through the motor armatures from a source, then opening the circuit connected to the motor armatures, then changing the relative connections of the motor armatures and changing the voltage of the source to that desired upon the motor armature circuit when connected as changed, and then closing the circuit from the source to the motor armatures.

25. The combination of a generator, a storage battery in series with the armature of said generator, a plurality of electric motors, means for connecting the armatures of said motors in parallel with each other and in series with the generator armature and said battery, a field winding on said generator being connected to said battery, and means for varying and reversing the electromotive force produced by said generator.

26. The combination of a generator, a storage battery in series with the armature of said generator, a plurality of electric motors, means for connecting the armatures of said motors in parallel with each other and in series with the said generator armature and the said battery, a field winding of said generator being connected to said battery, and a field winding upon each of said motors being connected to said battery, and means for varying the electromotive force of the generator for the purpose of speed control of the motors.

27. The combination of a generator, a storage battery in series with the armature of said generator, a plurality of electric motors, means for connecting the armatures of said motors in parallel with each other and in series with the said generator armature and said battery, a field winding of said generator being connected to said battery, a field winding of each of said motors being connected to said battery, and means for varying the field strength of said motors.

28. The combination of a generator, a storage battery in series with the armature of said generator, a plurality of electric motors in the series circuit of said battery and said armature, each of said motors having a driving connection with a driven part of a common load element, and means for varying the relative electromotive forces of said generator and motors whereby the motors act as generators and the generator acts as a motor to retard the common load element.

29. The combination of a generator, a storage battery electrically connected therewith, the electromotive force of said battery being much less than the full electromotive force of said generator, a plurality of electric motors, each of said motors having a driving connection with a common load element, and means for varying the relative electromotive forces of said generator and motors, whereby the motors act as generators and the generator acts as a motor to retard said load element.

30. The combination of a generator, a storage battery in series with the armature of said generator, a plurality of electric motors, means for connecting the armatures of said motors in parallel with each other and in series with the said generator armature and said battery, the two motor armatures acting upon a common load, and means for causing the motor armatures to be varied in speed and reversed in direction of rotation independently of a change of connections in the circuit containing said armatures.

31. The combination of an internal combustion engine, an electric generator having its armature driven thereby, a motor driven by energy from said generator, an electromotive force producing device supplied with energy derived from said engine, a field winding of said generator supplied with current from said device, means for reversing the current in said field winding, and electric means for producing a spark within the cylinder of said engine, said means comprising a circuit connected to said device.

32. The combination of an internal combustion engine, an electric generator having its armature driven thereby, a motor driven by energy from said generator, a storage battery whose maximum electromotive force is low compared with that of said generator and supplied with energy derived from said engine, a field winding of said generator and a field winding of said motor supplied with current from said battery, electric ignition means for said engine, said means comprising a circuit connected to said battery, and means for connecting the armature of said generator to said battery.

33. The combination of a source of electromotive force, a mechanically separate electric motor whose armature is supplied therefrom, a counter-electromotive force producing device in series in the circuit between the motor armature and said source, and means supplied with energy from said device for varying the electromotive force generated by said source.

34. The combination of an internal combustion engine, an electric generator whose armature is driven by said engine under normal operating conditions, a motor armature supplied with energy from said generator armature, a field winding for the generator adapted to be separately excited, means for reversing the voltage of said generator, a storage battery supplying current to said field winding, a field winding for said motor armature separately excited from said battery, and means whereby said battery may be charged by energy derived from said engine and employed at the will of the operator to start said engine in operation.

35. The combination of a generator, a storage battery in series with the armature of said generator, a plurality of electric motors, and means for connecting the armatures of said motors in series with each other and in series with said generator armature and said battery in a common circuit.

36. The method of operating a movable load element which consists in developing prime power, developing electric energy thereby, transmitting said energy to a propelling electric motor and varying and reversing the electromotive force of said energy, storing electric energy and employing such stored energy for starting the prime mover.

37. The method of operating a movable load element which consists in developing prime power, developing electric energy thereby, transmitting said energy to a propelling electric motor and varying the electromotive force of said energy, storing electric energy and generating electric energy by power derived from the movement of the element for electrically braking the element.

38. The combination of a plurality of motors adapted to drive a common load element, a dynamo for supplying energy to the armatures of said motors, and controlling means whereby the voltage of the dynamo may be increased from zero to a maximum while the motor armatures are connected in series, the armature circuit opened when the motors are in series, the voltage of the dynamo reduced to approximately that of each motor, the motor armatures connected in parallel across the dynamo, and the voltage of the dynamo increased.

39. The combination of a movable load element, a plurality of dynamo electric machines having their armatures mechanically connected to said load, means comprising a prime mover for supplying energy to said machines for driving the load, and means for controlling the electric energy generated by said machines when driven by the load comprising means for connecting said armatures in series and in parallel, and for varying the current in a separately excited field winding of said machines.

40. The method of controlling the speed of electric motors acting upon a common load which consists in separately exciting the field strength of the motors, passing a current through the motor armatures in series, varying the voltage impressed upon the motor armature circuit, and varying the field strength of the motors.

41. The method of controlling electric motors acting upon a common load which consists in energizing field windings of the motors independently of the motor armature current, passing current through the motor armatures in series, gradually increasing the voltage of said current, and then simultaneously and similarly weakening the field strength of the motors.

42. The method of controlling electric motors acting upon a common load which consists in energizing field windings of the motors independently of the motor armature current, passing current through the motor armatures in series, varying an electromotive force in series with said armatures to vary their speed, and simultaneously and similarly weakening the field strength of the motors.

43. The method of controlling a movable load element which consists in producing electric energy by successive explosions of explosive gas, transmitting a part of said energy to driving mechanism and driving the element thereby, reversing the electromotive force of said energy to reverse the direction of movement of said load element, utilizing a part of said produced energy to develop an electric spark for exploding said gas, storing a part of said produced energy, and utilizing said stored energy for starting the power producing apparatus.

44. The combination of a generator, a storage battery in series with the armature of said generator, a plurality of electric motors, means for connecting the armatures of said motors in series with each other and in series with the said generator armature and said battery, a field winding of said generator being connected to said battery, a field winding of each of said motors being connected to said battery, and means for varying the field strength of said motors.

45. A dynamo electric variable voltage source of energy, two electric motors having the armature windings supplied therefrom, said armatures acting upon a common movable load element, and a single controlling means for connecting said armatures in series and parallel and for varying the field strength of the motors for purposes of speed control.

46. The combination of a source of dynamo electric energy having means for varying the voltage of said source, a plurality of electric motors acting on a common load, the motor armatures being supplied from said source with variable voltages, and a single controlling means for connecting said motor armatures in series and parallel and controllably varying the motor field strength for purposes of speed control, and for causing at least one of said armatures to generate dynamic braking energy.

47. The combination of a prime mover and a dynamo electric machine operated thereby, said machine having means for varying the voltage thereof, two electric motors acting on a common load, the motor armatures being supplied with variable voltage energy produced by said dynamo electric machine, and a single controlling means for connecting said armatures in series and parallel and for varying the strength of the motor fields for purposes of speed control.

48. The combination of a prime mover on a dynamo electric machine driven by said prime mover, means for separately exciting a winding of said dynamo electric machine, two electric motors for propelling the movable load element, and a single means for connecting the motor armature windings in series and in parallel and for controlling the field strength of said motors.

49. The combination of a generator, a prime mover therefor, a storage battery charged by energy derived from said prime mover, the electromotive force of said battery being much less than the full electromotive force of said generator, a plurality of electric motors, each of said motors having a driving connection with a common load element, and means for varying the relative electromotive force of said generator and motors, whereby the motors act as generators and the generator acts as a motor to retard said load element.

50. The combination of an internal combustion engine, an electric generator having an armature and a field winding, means for mechanically driving the armature of said generator by said engine, a storage battery having a low electromotive force relatively to the full electromotive force of said generator and functionally related to said generator, a propelling electric motor supplied with energy from said generator or from said battery and means for varying and reversing the field strength of said generator.

51. The combination of an internal combustion engine, an electric generator whose armature is mechanically driven by said engine under normal operating conditions, a motor armature in series with said generator armature, a storage battery charged by energy derived from said engine, a circuit from said storage battery for supplying current to a field winding of said generator, and switching devices by which the said generator armature can be supplied with current from said storage battery to drive the generator as a motor for starting said engine.

52. The combination of an internal combustion engine having electric ignition means, an electric generator whose armature is mechanically driven by said engine under normal operating conditions, a storage battery charged by energy derived from said engine, a motor armature electrically connected with said generator armature, means for exciting a field winding of said generator independently of current passing through the circuit containing said generator armature, and means for passing a current from said battery through said generator armature so as to cause it to operate as a motor and thereby drive the engine and for supplying current to said ignition means.

53. The combination of an internal combustion engine, an electric generator having its armature mechanically driven thereby, a motor driven by energy from said generator, a storage battery charged by electric energy derived from said engine, means for connecting the armature of said generator to said storage battery to cause said generator to act as a motor to start the engine, electric ignition means for said engine, means for supplying energy from said battery to said ignition means, and means for reversing the motor independently of opening the armature circuit.

54. The combination of an internal combustion engine, an electric generator having an armature and a field winding, said armature being normally driven by said engine, a plurality of electric motors whose armatures are connected in circuit with the armature of said generator, an electromotive force producing device supplying current to a field winding of said generator, and means for varying at the will of the operator the electromotive force of said generator from a minimum to a maximum value and for reversing the electromotive force of said generator and for connecting the generator armature in circuit with said device for causing said generator to act as a motor to start the engine.

55. The combination of an internal combustion engine, a dynamo electric machine, the armature of said machine being mechanically driven by said engine, a motor having its armature supplied from said machine, said motor having a separately excited field winding, a storage battery adapted to be charged by energy derived from said engine, a separately excited field winding for said machine supplied from said battery, and means for employing said storage battery to supply electric energy to operate said machine as a motor to drive the engine.

56. The combination of an internal combustion engine, electric ignition means therefor comprising an induction coil, a low voltage storage battery adapted to supply energy to said induction coil for ignition purposes, a dynamo electric machine having a mechanical driving connection with said engine, means for causing said battery to be charged by electric energy derived from the normal operation of said engine and for causing said battery to supply energy to the armature of said dynamo electric machine to operate the same as a motor for starting the engine, and an electric motor whose armature is supplied with electric energy derived from said engine, said electric motor having a field winding supplied with current from said battery.

This specification signed and witnessed this 24th day of February 1903.

H. WARD LEONARD.

Witnesses:
JOHN G. QUINBY,
MARY E. QUINBY.